United States Patent [19]
McConnell et al.

[11] 3,834,793
[45] Sept. 10, 1974

[54] DICHROMIC MIRROR HAVING MULTILAYER THIN FILMS INCLUDING VANADIUM DIOXIDE

[75] Inventors: Lloyd T. McConnell, Dallas; John R. Trimmier, Arlington, both of Tex.

[73] Assignee: Advance Technology Center, Inc., Dallas, Tex.

[22] Filed: June 21, 1973

[21] Appl. No.: 372,378

[52] U.S. Cl. .............................................. 350/160 R
[51] Int. Cl. ................................................ G02f 1/28
[58] Field of Search ................ 350/160 R, 288, 290

[56] References Cited
UNITED STATES PATENTS
3,323,241   6/1967   Blair et al. ..................... 350/160 R OTHER PUBLICATIONS
"French Develop Vanadium Dioxide Thin Film Switch," in Electronics, Aug. 16, 1971.

Primary Examiner—Ronald L. Wibert
Assistant Examiner—Paul K. Godwin
Attorney, Agent, or Firm—Charles W. McHugh

[57] ABSTRACT

An optical effect device in the form of a multi-layer mirror, with at least one layer consisting of vanadium dioxide, and the layers being limited in thickness to about 2,000 Angstroms such that interference effects can provide essentially any desired color. Methods are disclosed for determining what two colors are achievable with a given mirror as the $VO_2$ is carried through its transition temperature, and methods are disclosed for optimizing the contrast in reflectance between the mirror in its hot and cold states.

7 Claims, 13 Drawing Figures

REFLECTANCE VS. THICKNESS OF VO$_2$ FILM ON ALUMINUM SUBSTRATE ($\lambda_0$ = 6000 Å)

REFLECTANCE VS. WAVELENGTH FOR 600 Å VO$_2$ LAYER ON ALUMINUM

REFLECTIVITY VS. VO₂ FILM THICKNESS
WHEN A 1085Å LAYER OF MgF₂ IS BETWEEN VO₂ AND
ALUMINUM SUBSTRATE $\lambda_0$=6000Å

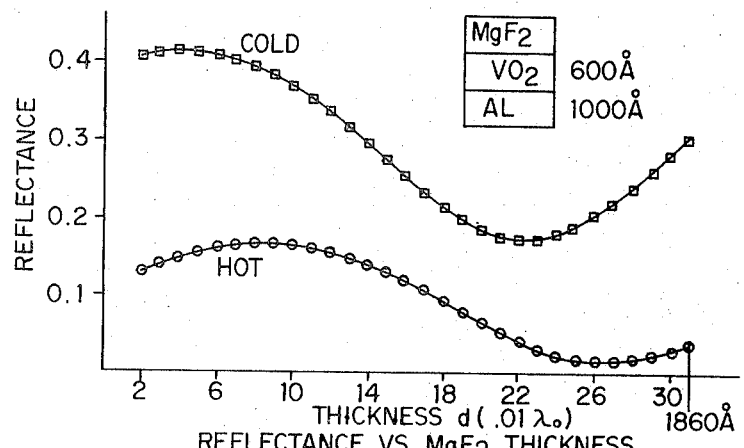
FIG. 10
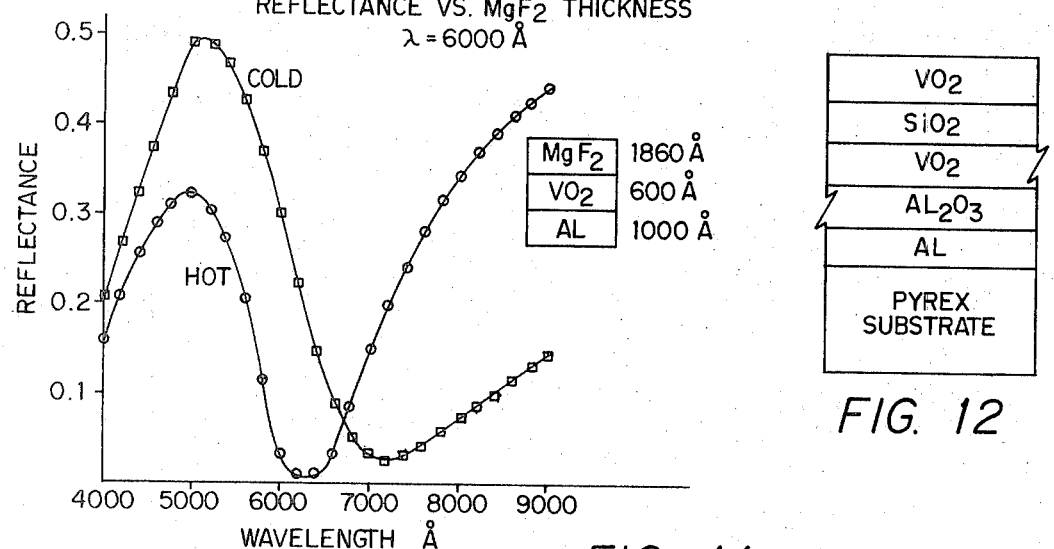
FIG. 11
FIG. 12
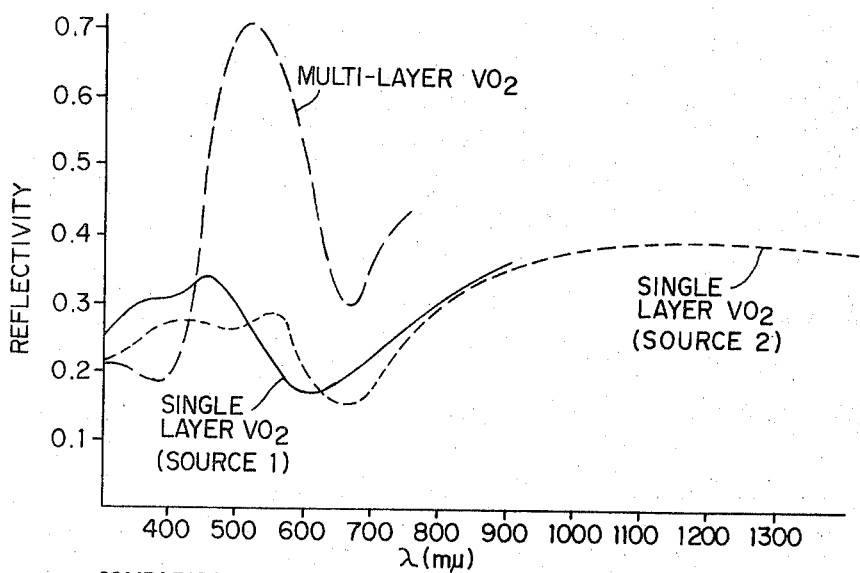
FIG. 13
COMPARISON OF THE REFLECTANCES OF TWO SINGLE LAYERS OF VO₂ WITH A MULTILAYER VO₂ - DIELECTRIC STACK AT 25°C

DICHROMIC MIRROR HAVING MULTILAYER THIN FILMS INCLUDING VANADIUM DIOXIDE

This invention relates in general to optical effect devices wherein very thin films of thermochromic material are caused to change their reflective characteristics in response to thermal stimuli. More particularly, it relates to dichromic mirrors which utilize interference in very thin films to provide a desired color pair.

In the art of making passive display devices, materials which change color in response to a change in temperature over a certain range of temperatures have received appreciable attention. Such materials in which the change of color is reversible are generally referred to as thermochromic materials. Actually, such materials are said to change "color" because of the change in the wave length of the light which they reflect when illuminated with white light.

Such changes in color with some materials can be very dramatic, such as from red to black, yellow to red, and yellow to dark brown. A listing of several thermochromic materials and their characteristic color change is given in U.S. Pat. No. 3,323,241 to Blair, et al. Another thermochromic material is known to be vanadium dioxide, and several uses for it are taught in U.S. Pat. No. 3,438,022 to Teeg. As disclosed by Teeg, however, only two color states are available in $VO_2$, those two being a light grey when the material is below its transition temperature (which is about 67°C) and a dark blue-black when the material is heated above its transition temperature. It has now been discovered that this same material can be caused to exhibit a great variety of colors, including dark blue, green, brown, pink, red, etc.

It is well known that the inherent reflectance of vanadium dioxide is very poor (e.g., about 20 percent), and the contrast between its natural high and low temperature states is also poor. One reason that its reflection is poor is because its absorption is high. It has been found, however, that the high absorption of $VO_2$ is not so great as to be ruinous if the wavelength of incident light is greater than about 4,000 A and the thickness of films of $VO_2$ is restricted to no more than 2,000 A. In fact, by keeping the thickness between 150A and 2,000 A, the absorption effect can be considered insignificant relative to the change in refractive index of the material as it experiences a change in temperature over a certain range. Accordingly, it will be understood that this invention is concerned with the highly useful change in refractive index of thin film of vanadium oxides while appropriately managing other competing physical effects.

While its characteristic reflectance is not outstanding, there are valid reasons for trying to utilize $VO_2$ rather than discarding it in favor of some other thermochromic material. One reason is that its transition temperature is within convenient reach with only modest heating. Another one of those reasons is that $VO_2$ is relatively stable compared to any thermochromic materials, and its grain size is also advantageously small. The small grain size contributes to good resolution, as will be discussed later.

A major object of this invention to provide a technique for achieving enhanced reflections from thin films of vanadium dioxide or other transition metal oxides. It has been found that this object (and several others) are satisfied by taking a reflective substrate (such as aluminum on a quartz substrate) and coating the same with a thin layer of thermochromic material such as vanadium dioxide. The thickness of the $VO_2$ film may be established to provide a desired color when it is in either its hot or cold state; or the thickness may be established to provide a maximum contrast in reflectances between the two states—a situation that might be desirable if the device is being used for display purposes. A compromise between maximum contrast and favorable color pairing can also be established with this invention. In some cases it may also be desirable to cover the $VO_2$ film with a transparent dielectric film. Selecting a dielectric film whose index of refraction is appreciably different from that of the $VO_2$ film can increase the total reflectance for a pair of layers.

In the drawing:

FIG. 10 is a plot of reflectance versus thickness of a film of magnesium flouride, wherein the magnesium flouride covers a layer of vanadium dioxide.

FIG. 11 illustrates the spectral response of a particular multi-layer mirror.

FIG. 12 diagrammatically illustrates a multi-layer mirror in which there are two layers of vanadium dioxide separated by a thin transparent dielectric film of silicon dioxide; and FIG. 13 includes reflectance curves showing the improved response of a multi-layer mirror in comparison with a single layer mirror of vanadium dioxide.

Figure 1:
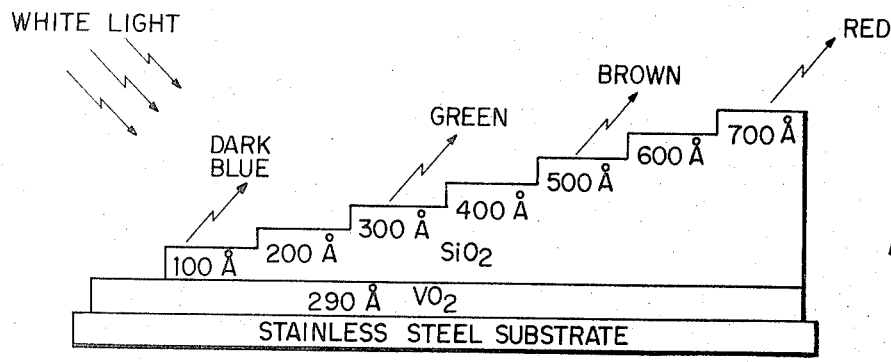
FIG. 1 is an elevation view of a multi-layer mirror showing how varied colors can be achieved with a thin film of $VO_2$.

Referring now to FIG. 1, an exemplary substrate 10 of stainless steel is provided. On top of the substrate is a thin coating 12 of vanadium dioxide, i.e., vanadium oxide having the formula $VO_x$ where $x$ is about 2. Such a thin film 12 can no doubt be deposited on the substrate in any of several ways, although the preferred technique is that disclosed in the copending application Ser. No. 284,304, filed on Aug. 28, 1972 entitled "Preparation of Thin Films of Vanadium Oxide" by the same two inventors as are named herein. The thickness of the vanadium oxide film 12 can be within the range of a few hundred angstroms up to, say, 2,000 Angstroms. Thicknesses in excess of 2,000 Angstroms should be avoided because vanadium oxides are so notoriously light absorbing. In the example of FIG. 1, the $VO_2$ film is about 290 Angstroms thick, and it is essentially transparent. On top of the $VO_2$ film 12 is a varied-thickness layer 14 of non-absorbing material, which in this case is silicon dioxide.

When white light is directed at the multilayer composite at room temperature, instead of the plain grey appearance which has been previously reported, a person can observe several bright colors. The multicolor effect that is achieved is the result of interference of certain wave lengths in the reflected light, such that a predominant color representing the unaffected wavelengths is seen by the human eye. The wavelengths that are removed from the reflected light by interference and/or absorption are dependent upon the thickness of each of the composite's elements and the respective refractive index of each element. Interference occurs when a ray which is partially reflected from the top surface of a thin film is one-half wave length out of phase with the remainder of the ray as it emerges after being reflected from the bottom surface of the film.

It is known that the condition for interference of reflected light generally involves films having an optical thickness on the order of one-fourth of the wavelength of the incident light, because the ray which is reflected from the bottom surface traverses the film twice before emerging to be ½ wavelength out of phase with the reflected surface wave. Other considerations, however, are the index of refraction of the film material and the nature of the film/substrate interface. The matter is more complicated, too, when the light is being reflected from a pair of layers, rather than a single film. A treatment of the even more complex situation when there are several pairs of layers does not seem to be necessary here, although a matrix solution for Maxwell's equations can be found in "Optical Properties of Thin Solid Films" by Dr. O. S. Heavens, published by Dover Publications in 1965. In general, it may be said that the criterion for light interference is that a simple film must have a thickness on the order of $\lambda/4N$, where $\lambda$ is the particular wavelength of light in air and N is the index of refraction of the film. The index of refraction of $VO_2$ changes as the material is heated to a temperature above its transition temperature, and the apparent color of the various pairs of layers changes as the $VO_2$ is heated above 68°C. The index of refraction of the dielectric will not usually change enough to be perceptible at temperatures less than 100°C; but when the characteristics of one of the components (i.e., the $VO_2$ layer) changes, then the reflectance of the entire composite can be expected to change.

The presence of interference does not necessarily mean that the resulting reflected light will be of sufficient brilliance to be readily exploited. The bright and clear colors observable with the embodiment shown in FIG. 1, however, can be of definite utility in the art of passive displays. For other uses that may require even greater reflectance, a technique for enhancing the reflectance of light from thermochromic films of the type thus far described is discussed.

A useful design technique for thermochromic mirrors is to solve the given equations by Heavens for a series of $VO_2$ film thicknesses for the two different optical states of the film. In order to accomplish this task a data bank is preferably constructed which contains the optical constants of many useful optical materials, in addition to those constants for the two states of $VO_2$. The data bank could be small if resources so dictate; but it could also be quite extensive, since there is considerable wavelength dependence of the optical constants of metals and $VO_2$ in the wavelength regime from the near ultraviolet to the infrared. For $VO_2$ the optical constants as reported by G. F. Derbenwick (U.S. Army Research Office Technical Report No. 5220–2, August, 1970) were used. For the metals and dielectrics, the optical constants from the *Handbook of the American Institute of Physics* were used.

As an example of the design procedure, let it be assumed that there is a desire to determine the response of a two-layer system of $VO_2$ on aluminum at a given wavelength, e.g., $\lambda = 6,000$ A (orange). Of course, it might be possible that the success of a proposed $VO_2$-on-aluminum device could be determined by going into the laboratory and making thousands of samples, each with varied thicknesses of layers, and then testing each sample. Another somewhat laborous way might be to mathematically solve the equations of Heavens (previously referred to) for a significant number of conditions, in hope of establishing a trend that will be meaningful. The preferred technique, however, is to merely enter the optical constants of air, $VO_2$, and aluminum at 6,000 A into a suitably programmed computer. To enable a person skilled in the art to readily grasp the fundametals of the invention, an exemplary program (identified for convenience as FL4) will now be described.

Program FL4 is designed to compute the reflectance of multilayer films and the transmittance of the films for those cases where the substrate is non-absorbing—for a specified wavelength. The program consists of statements in FORTRAN IV language which reduce the formulas given by Heavens in "Optical Properties of Thin Solid Films" (at pages 74–77) to a scheme which can be interpreted by any computer containing a FORTRAN IV compiler. Actual numerical values of reflectance and transmittance can be obtained as output data from the execution of FL4, after the multilayer film properties are supplied by the user upon request by the computer. A detailed explanation of the individual program steps follows.

Lines 1–3 have the effect of designating computer memory locations in which input data values, output values and intermediate parameter values will be stored during execution of the program. A statement of this type is called a DIMENSION statement.

Lines 6–7 cause the statement "Input No. of layers and XL" to be printed by the terminal. XL is the symvol meaning wavelength of incident radiation. A units are to be used.

Line 8 allows the user to respond to the prompting by inputting the number of layers and the wavelength.

Line 9 adds unity to the number of layers so that in subsequent operations this index will not take on the value of zero.

Lines 10–11 cause the statement "Input thicknesses and Index-values" to be printed by the terminal.

Lines 12–13 allow the user to respond "K" times by inputting K-sets of input data corresponding to the layer thicknesses, as well as real and imaginary values of the corresponding indices of refraction. For a mirror, the thickness of the aluminum layer is selected so that the layer will be opaque, e.g., 1,000 A.

Lines 14–15 set the real and imaginary parts of the index of refraction of air to 1.0 and 0.0, respectively.

Line 16 sets the value of the layer thickness corresponding to the air to 1.0. This is a dummy value.

Line 20 causes the lines between line 20 and line 66 and including line 66 to be executed 15 times.

Line 21 successively increases the thickness of layer "2" by 20 A. This line may be amended to increment any desired layer thickness.

Line 29 causes the program steps 30 through and including line 42 to be executed K times, incrementing the value of L by 1 each time, from an initial value of 1.

Lines 30–32 assign values to $Y(L+1)$, $G(L+1)$, and stores these in the locations reserved by the DIMENSION statement (Lines 1–3). The values are obtained by arithmetic operations as expressed in the statements where "+" is ordinary addition, "/" is ordinary division, and "↑" indicates exponentiation. $G(L+1)$ and $H(L+1)$ correspond to the quantities 4(111) of Heavens.

Lines 33–34 cause the phase angle $A(L)$ and $GA(L)$ to be assigned values. These quantities are defined by 4(112) of Heavens.

Lines 35–42 cause the quantities $P(L+1)$, $Q(L+1)$, $R(L+1)$, $S(L+1)$, $T(L+1)$, $V(L+1)$, $U(L+1)$, and $W(L+1)$ to be computed. These correspond to the quantities $P_m$, $q_m$, $r_m$, $S_m$, $t_m$, $v_m$, $u_m$ and $w_m$ given by Heavens at the bottom of page 75 and the top of page 76.

Lines 43–50 cause the quantities $R1(3)$, $S1(3)$, $V1(3)$, $W1(3)$, $T1(3)$, $U1(3)$, $P1(3)$, and $Q1(3)$ to be assigned numerical values which are stored. These quantities are defined in Heavens by 4(113).

Line 51 causes lines 52 through and including line 60 to be executed K−3 times, incrementing the value of L by 1, from an initial value of 3.

Lines 52–60 cause the quantities $P1(L+1)$, $Q1(L+1)$, $R1(L+1)$, $S1(L+1)$, $T1(L+1)$, $U1(L+1)$, $V1(L+1)$, and $W1(L+1)$ to be assigned values which are stored. These quantities are defined by Heavens in 4(113) and are the values corresponding to those of lines 43–50 for layers numbered greater than 3.

Line 61 causes the variable ANS to be computed and stored from the quantities already evaluated. ANS corresponds to the reflectance from the multi-layer film.

Line 62 sets the variable PROD to the value 1.0.

Line 63 causes line 64 to be executed N1−2 times where N1 is equal to the number of layers plus 1. The index L is incremented by 1 each time, with an initial value of 2.

Line 64 evaluates the variable PROD which is stored for L = N1.

Line 65 causes a value to be assigned to the variable TRANS which is the transmittance value for the film if the film is deposited on a non-absorbing substrate.

Lines 65–68 causes the computed reflectance and transmittance values, the wavelength, and the thickness of layer 3 to be printed on the terminal.

Line 69 causes line 6 to be executed next. This allows additional calculations to be made without initiating start-up procedures.

Line 70 informs the FORTRAN compiler that the program ends at this point.

An additional program is provided that utilizes an extensive data bank containing optical constants of $VO_2$ and several other materials as a function of wavelength. When the parameters of a particular mirror (total number of layers, choice of materials, and thicknesses) are entered in the computer, it locates the appropriate optical constants in the data bank and then computes the reflectance and transmittance of the mirror. The results are typically printed out (according to statements 1340 and 1350), and they can then be plotted as in FIG. 3.

---

FL4

```
1 DIMENSION XN(52),XK(52),G(26),H(26),Y(26),D(26),A(26),GA(26),%

2 P(26),Q(26),R(26),S(26),T(26),U(26),V(26),W(26),%

3 P1(26),Q1(26),R1(26),S1(26),T1(26),U1(26),V1(26),W1(26)

6 4 WRITE(6,1)

7 1 FORMAT(' INPUT NO. OF LAYERS AND XL'/)

8 READ(5,*) K,XL

9 N1=K+1

10 WRITE(6,2)

11 2 FORMAT(' INPUT THICKNESSES AND INDEX-VALUES'/)

12 DO 77 I=2,N1

13 77 READ(5,*) D(I),XN(I),XK(I)

14 XN(1)=1.0
```

```
15 XK(1)=0.0

16 D(1)=1.0

20 DO 197 J=1,15

21 D(2)=D(2)+20.0

29 DO 200 L=1,K

30 Y(L+1)=(XN(L)+XN(L+1))↑2+(XK(L)+XK(L+1))↑2

31 G(L+1)=(XN(L)↑2+XK(L)↑2-XN(L+1)↑2-XK(L+1)↑2)/Y(L+1)

32 H(L+1)=2.0*(XN(L)*XK(L+1)-XN(L+1)*XK(L))/Y(L+1)

33 A(L)=6.2832*XK(L)*D(L)/XL

34 GA(L)=6.2832*XN(L)*D(L)/XL

35 P(L+1)=EXP(A(L))*COS(GA(L))

36 Q(L+1)=EXP(A(L))*SIN(GA(L))

37 R(L+1)=EXP(A(L))*(G(L+1)*COS(GA(L))-H(L+1)*SIN(GA(L)))

38 S(L+1)=EXP(A(L))*(H(L+1)*COS(GA(L))+G(L+1)*SIN(GA(L)))

39 T(L+1)=EXP(-A(L))*(G(L+1)*COS(GA(L))+H(L+1)*SIN(GA(L)))

40 V(L+1)=EXP(-A(L))*COS(GA(L))

41 U(L+1)=EXP(-A(L))*(H(L+1)*COS(GA(L))-G(L+1)*SIN(GA(L)))

42 200 W(L=1)=-EXP(-A(L))*SIN(GA(L))

43 R1(3)=R(3)+G(2)*V(3)-H(2)*W(3)

44 S1(3)=S(3)+H(2)*V(3)+G(2)*W(3)

45 V1(3)=V(3)+G(2)*R(3)-H(2)*S(3)

46 W1(3)=W(3)+H(2)*R(3)+G(2)*S(3)

47 T1(3)=T(3)+G(2)*P(3)-H(2)*Q(3)

48 U1(3)=U(3)+H(2)*P(3)+G(2)*Q(3)

49 P1(3)=P(3)+G(2)*T(3)-H(2)*U(3)

50 Q1(3)=Q(3)+H(2)*T(3)+G(2)*U(3)

51 15 DO 50 L=3,K

52 P1(L+1)=P(L)*P(L+1)-Q1(L)*Q(L+1)+R1(L)*T(L+1)-S1(L)*U(L+1)
```

```
53 Q1(L+1)=Q1(L)*P(L+1)+P1(L)*Q(L+1)+S1(L)*T(L+1)+R1(L)*U(L+1)

54 R1(L+1)=P1(L)*R(L+1)-Q1(L)*S(L+1)+R1(L)*V(L+1)-S1(L)*W(L+1)

55 S1(L+1)=Q1(L)*R(L+1)+P1(L)*S(L+1)+S1(L)*V(L+1)+R1(L)*W(L+1)

56 T1(L+1)=T1(L)*P(L_1)-U1(L)*Q(L+1)+V1(L)*T(L+1)-W1(L)*U(L+1)

57 U1(L+1)=U1(L)*P(L+1)+T1(L)*Q(L+1)+W1(L)*T(L+1)+V1(L)*U(L+1)

58 V1(L+1)=T1(L)*R(L+1)-U1(L)*S(L+1)+V1(L)*V(L+1)-W1(L)*W(L+1)

59 W1(L+1)=U1(L)*R(L+1)+T1(L)*S(L+1)+W1(L)*V(L+1)+V1(L)*W(L+1)

60 50 CONTINUE

61 ANS=(T1(K+1)↑2+U1(K+1)↑2)/(P1(K+1)↑2+Q1(K+1)↑2)

62 PROD=1.0

63 DO 111 L=2,N1

64 111 PROD=((1+G(L))↑2+H(L)↑2)*PROD

65 TRANS=XN(K+1)*PROD/(P1(K+1)↑2+Q1(K+1)↑2)

66 197 WRITE(6,112)TRANS,ANS,XL,D(3)

67 112 FORMAT(' TRANS=',F4.3,'   REFL=',F4.3,%

68 ' XL=',F5.0, ' TH DIEL=',F5.0/)

69 GO TO 4

70 END
```

_FL7_

```
1 DIMENSION XN(52),XK(52),G(26),H(26),Y(26),D(26),A(26),GA(26),%

2 P(26),Q(26),R(26),S(26),T(26),U(26),V(26),W(26),%

3 P1(26),Q1(26),R1(26),S1(26),T1(26),U1(26),V1(26),W1(26)

5 DIMENSION ICOM(20),XNN(2,10,200),XKK(2,10,200)

6 DIMENSION XL1(200)

10 1 WRITE(6,2)

11 2 FORMAT ('INPUT NUMBER OF LAYERS'/)

12 READ(5,*)K

13 N1=K+1
```

```
14  IRUN=0
20  WRITE(6,3)
21  3 FORMAT('INPUT LAYER COMP-CODES AND INITIAL THICKNESSES'/)
22  DO 100 I=2,N1
23  100 READ(5,*1)ICOM(I),D(I)
66  6 WRITE(6,10)
67  10 FORMAT('INPUT INITIAL,FINAL WVL, INCR'/)
68  READ(5,*)XLX1,XLX2,DXL
69  IWL=(XLX@-XLX1)/50.0+1.0
700 IRUN=1
705 CALL OPEN(3,'INDEX3',INPUT')
708 200 DO 208 M9=1,2
710 READ(3,*)XL
711 READ(3,*)XN1,XN2
712 READ(3,*)XN3,XN4
713 READ(3,*)XN5,XN6
714 READ(3,*)XN7,XN8
715 READ(3,*)XN9,XN10
716 READ(3,*)XN11,XN12
717 READ(3,*)XN13,XN14
718 READ(3,*)XN15,XN16
719 208 CONTINUE
740 IF(XL+50.0-XLX1)200,210,210
750 210 DO 220 I=1,IWL
760 READ(3,*)XL1(I)
761 DO 221 J=2,9
762 READ(3,*)XNN(1,J,I),XKK(1,J,I)
763 221 CONTINUE
764 READ(3,*)XL1(I)
```

```
765 DO 269 J=2,9
766 READ(3,*)XNN(2,J,I),XKK(2,J,I)
767 269 CONTINUE
800 220 CONTINUE
810 CALL CLOSE(3)
820 400 WRITE (6,401)
830 401 FORMAT('      XL      REFL      TRANS'/)
840 IF(DXL)223,223,225
850 223 N3=1
860 GO TO 226
870 225 N3=DXL/50.0
880 226 DO 2000 J=1,IWL,N3
890 DO 2000 K5=1,2
900 DO 250 L=1,K
910 XN(L+1)=XNN(K5,ICOM(L+1),J)
920 XK(L+1)=XKK(K5,ICOM(L+1),J)
930 250 XL=XL1(J)940 D(1)=1.0
950 XN(1)=1.0
960 XK(1)=0.0
970 DO 290 L=1,K
980 Y(L+1)=(XN(L)+XN(L+1))'2+(XK(L)+XK(L+1))'2
990 G(L+1)+(XN(L)'2+XK(L)'2-XN(L+1)'2-XK(L+1)'2)/Y)L+1)
1000 H)L+1)=2.0*(XN(L)*XK(L+1)=XN(L+1)*XK(L))/Y(L+1)
1010 A(L)=6.2832*XK(L)*D(L)/XL
1020 GA(L)=6.2832*XN(L)*D(L)/XL
1030 P(L+1)=EXP(A(L))*COS(GA(L))
1040 Q(L+1)=EXP(A(L))*SIN(GA(L))
1050 R(L+1)=EXP(A(L))*(G(L+1)*COS(GA(L))-H(L+1)*SIN(GA(L)))
1060 S(L+1)=EXP(A(L))*(H(L+1)*COS(GA(L))+G(L+1)*SIN(GA(L)))
```

```
1070 T(L+1)=EXP(-A(L))*(G(L+1)*COS(GA(L))+H(L=1)*SIN(GA(L)))

1080 V(L+1)=EXP(-A(L))*COS(GA(L))

1090 U(L+1)=EXP(-A(L))*(H(L+1)*COS(GA(L))-G(L+1)*SIN(GA(L)))

1100 290 W(L+1)=EXP(-A(L))*SIN(GA(L))

1110 R1(3)=R(3)+G(2)*V(3)-H(2)*W(3)

1120 S1(3)=S(3)+H(2)*V(3)+G(2)*W(3)

1130 V1(3)=V(3)+G(2)*R(3)-H(2)*S(3) 1140 W1(3)=W(3)+H(2)*R(3)+G(2)*S(3

1140 WL(3)=W(3)+H(2)*R(3)+G(2)*S(3)

1150 T1(3)+T(3)+G(2)*P(3)-H(2)*Q(3)

1160 U1(3)=U(3)+H(2)*P(3)+G(2)*Q(3)

1170 P1(3)=P(3)+G(2)*T(3)-H(2)*U(3)

1180 Q1(3)=Q(3)+H(2)*T(3)+G(2)*U(3)

1190 DO 69 L=3,K

1200 P1(L+1)=P1(L)*P(L+1)-Q1(L)*Q(L+1)+R1(L)*T(L+1)-S1(L)*U(L+1)

1210 Q1(L+1)=Q1(L)*P(L+1)+P1(L)*Q(L+1)+S1(L)*T(L+1)+R1(L)*U(L+1)

1220 R1(L+1)=P1(L)*R(L+1)-Q1(L)*S(L+1)+R1(L)*V(L+1)-S1(L)*W(L+1)

1230 S1(L+1)=Q1(L)*R(L+1)+P1(L)*S(L+1)+S1(L)*V(L+1)+R1(L)*W(L+1)

1240 T1(L+1)=T1(L)*P(L+1)-U1(L)*Q(L+1)+V1(L)*T(L+1)-W1(L)*U(L+1)

1250 U1(L+1)=U1(L)*P(L+1)+T1(L)*Q(L+1)+W1(L)*T(L+1)+V1(L)*U(L+1)

1260 V1(L+1)=T1(L)*R(L+1)-U1(L)*S(L+1)+V1(L)*V(L+1)-W1(L)*W(L+1)

1270 W1(L+1)=U1(L)*R(L+1)+T1(L)*S(L+1)+W1(L)*V(L+1)+V1(L)*W(L+1)

1280 69 CONTINUE

1290 ANS=(T1(K+1)'2+u1(K+1)'2)/(P1(K+1)'2+Q1(K+1)'2)

1300 PROD=1.0

1310 DO 111 L=2, N1

1320 111 PROD=((1+G(L))'2+H(L)'2)*PROD

1330 TRANS=XN(K+1)*PROD/(P1(K+1)'2+Q1(K+1)'2

1340 900 WRITE(6,901)XL,ANS,TRANS 1350 901 FORMAT(10X,F6.0,10X,F5.4,10X,F5.4)
```

1360 2000 CONTINUE

1370 GO TO 1

1380 END

Using the program FL4, the reflectance values for a series of $VO_2$ film thickness (for both the high and low temperature states of the $VO_2$) can be obtained. Such values are graphically shown in FIG. 2, which is a plot of these data in which he $VO_2$ thickness varies from $0.0\lambda_o$ to greater than $0.3\lambda_o$. It should be particularly noted that the reflectance curve goes through a series of maxima and minima as the $VO_2$ film becomes thicker. The effects of absorption are clearly evident as succeeding peaks are lower and the minima are broadened. Also, from an inspection of FIG. 2 it will be apparent that the data set for the cold device can be divided by the data set for the hot device (in a well-known manner) to yield ratios of contrast versus film thickness. It is no trouble, then, to identify that particular ratio which corresponds to a total reflectance value which is optimum.

Figure 2:
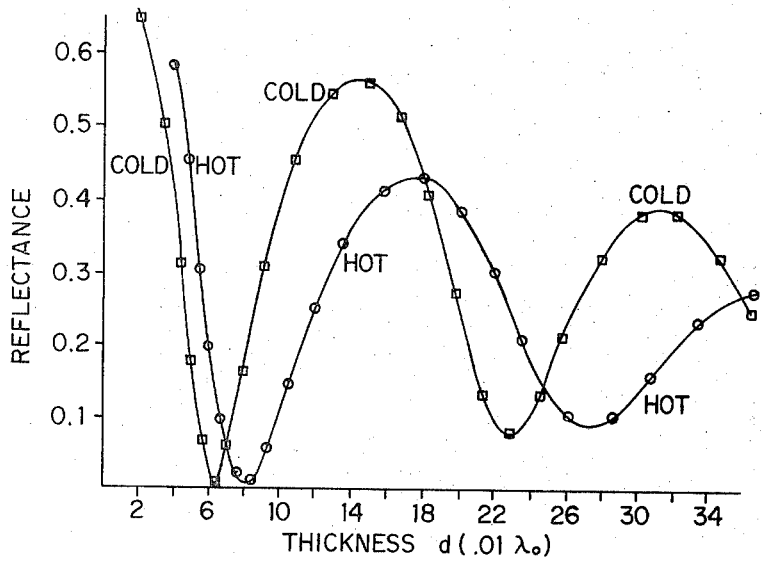
FIG. 2 is a plot of the reflectance of films of $VO_2$ having varied thicknesses.

The utility of the curves in FIG. 2 can perhaps best be demonstrated in a specific design. Suppose at 6,000 A it is desired to have a mirror which has a 40 percent reflectance in the low temperature state, and the smallest possible reflectance in the high temperature state, i.e., as close as possible to a dark "color" or black. These curves show that the best design will be a $VO_2$ film which is $0.1\lambda_o$ or 600 A thick, which will have a hot reflectance of about 12 percent. An alternate design could have achieved 40 percent reflectance in the cold state with a film $0.32\lambda_o$ thick, but the hot reflectance would have only dropped to about 16.5 percent. With the 600 A film, information could be more readily recorded for visual display, since the contrast between the cool and hot states would be greater and therefore more easily observed.

Figure 3:
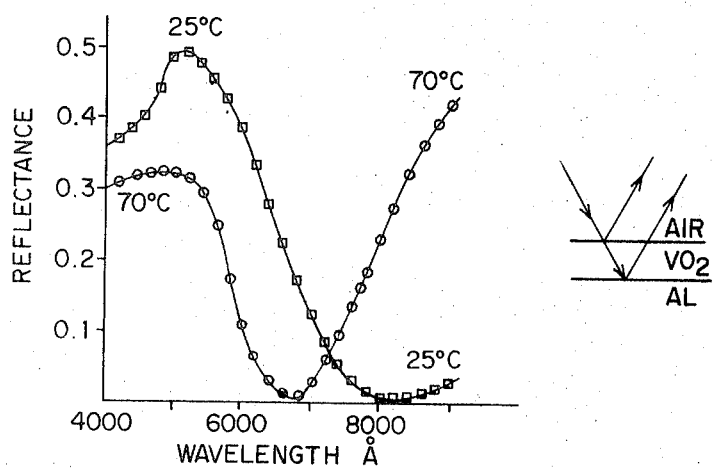
FIG. 3 is a plot of the spectral response of a mirror having a single 600 A $VO_2$ layer.

Having chosen an optimum thickness for the $VO_2$ layer, computer program FL7 can be used to generate the spectral response of the mirror at all wavelengths of interest; this is shown in FIG. 3. In the human eye, this mirror would appear to change from red to green as it is heated through the transition temperature.

Figure 4:
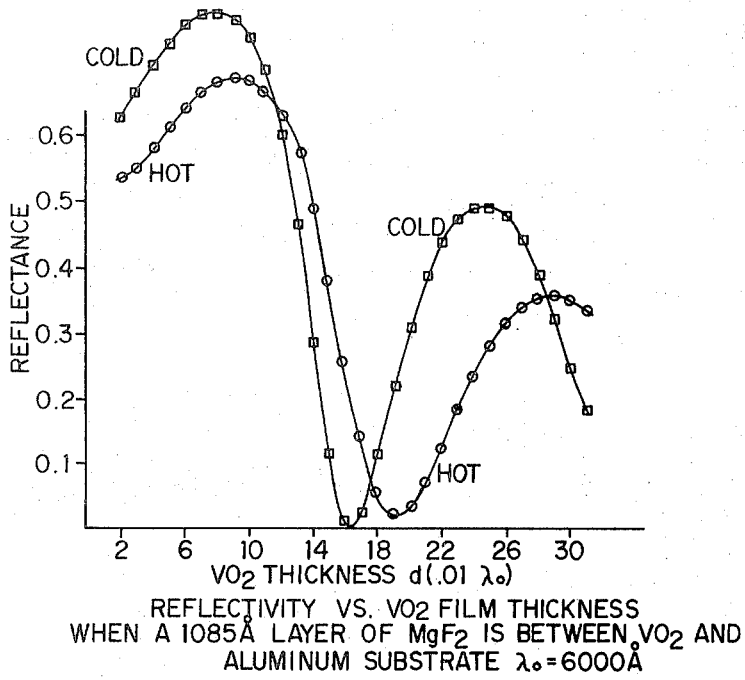
FIG. 4 is a plot of reflectance versus $VO_2$ film thickness when the $VO_2$ lies on top of a $MgF_2$ film 1,085 A thick.

The foregoing design techniques provide a means to generate thermochromic surfaces of many colors, contrasts, and reflectances; but the $VO_2$-Al stack may not always be the optimum design. For example, the high thermal conductivity of the aluminum will reduce the sensitivity and resolution of the mirror. An improved design would separate the $VO_2$ layer from the Al layer with a transparent, dielectric layer having a low thermal conductivity. In order to illustrate the optical design of a $VO_2$-$MgF_2$-Al thermochromic device which is characterized by improved resolution and sensitivity, the reflectance of such a stack is shown in FIG. 4; the $MgF_2$ has an optical thickness of a quarter wavelength at the design wavelength of 6,000 A, and various thicknesses of $VO_2$ are shown along the abscissa. It can be noted, in comparing FIG. 2 to FIG. 4, that the maxima and minima are displaced to the right, indicating the requirement of greater thickness to obtain similar effects.

Figure 5:
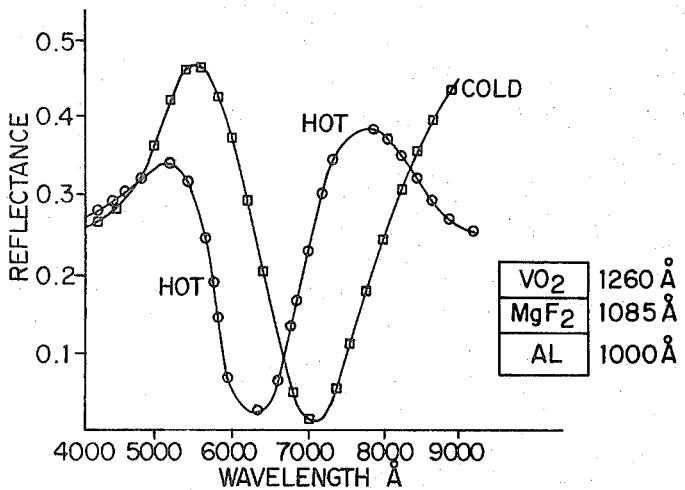
FIG. 5 is a plot of reflectance versus wavelength for a stacked mirror of $VO_2$ and $MgF_2$.

Let it now be assumed that the same requirements for the thermochromic mirror exist as before, i.e., about 40 percent reflectance in the low temperature state and the smallest possible reflectance in the high temperature state at 6,000 A. Referring to FIG. 4, this result can be obtained for a $VO_2$ film thickness of about $0.21\lambda_o$ or 1,260 A. When the reflectance of this stack is calculated as a function of wavelength the response curve shown in FIG. 5 is obtained. It is of particular significance to compare FIG. 5 to FIG. 3, which will reveal that their superficial appearance is about the same. However, even though the predicted behavior at 6,000 A is obtained in both cases, the bandwidth of the mirror of FIG. 5 is much narrower and the mirror will be a slightly different color when observed with the eye.

Figure 6:
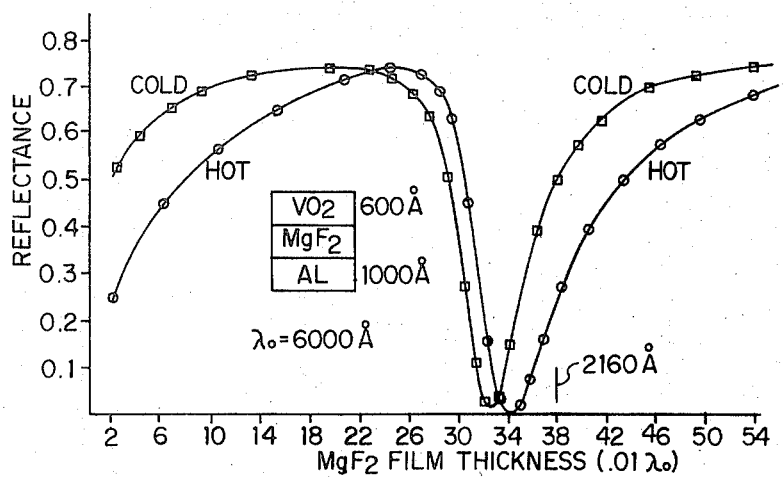
FIG. 6 is a plot of reflectance versus thickness of $MgF_2$ in a multilayer mirror.
Figure 7:
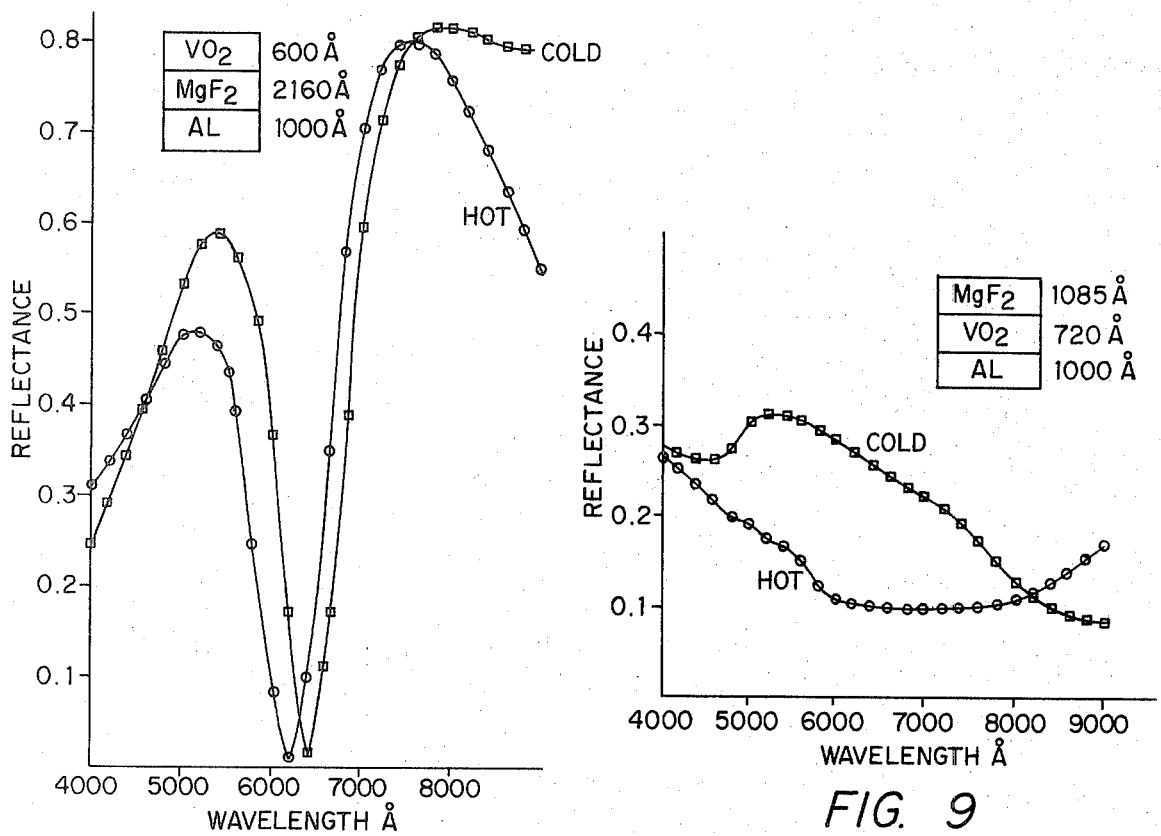
FIG. 7 is a plot of reflectance versus wavelength for a particular mirror.

An alternative design technique for the $VO_2$-$MgF_2$-Al stack is to specify a certain $VO_2$ film thickness and then calculate the reflectance of the stack as a function of the $MgF_2$ thickness. For example, in FIG. 6 the $VO_2$ thickness has been specified as 600 A, and the reflectance of the stack has been plotted as a function of the $MgF_2$ thickness. The vehavior of this curve is decidedly different from FIGS. 2 and 4; the maximum values of the reflectance which are obtained are much greater, and the only thickness producing much contrast is near the minimum at $0.34\lambda_o$. But, using the criteria of the earlier examples of about 40 percent maximum reflectance in the cold state and the smallest reflectance obtainable in the hot state, such results should be obtained with a film of 2,160 A of $MgF_2$. A plot of the reflectance of this stack of 600 A of $VO_2$ on 2160 A of $MgF_2$ on an aluminum surface vs. wavelength is shown in FIG. 7. This thermochromic mirror performs as expected at the design wavelength of 6,000 A, but it has a quite narrow bandwidth and would probably have a small contrast when viewed in ambient lighting with the eye.

Figure 9:
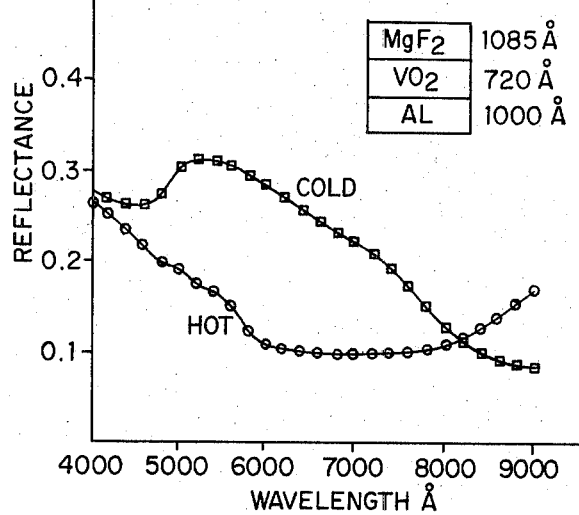
FIG. 9 is a plot of reflectance versus wavelength for a particular embodiment of a mirror, wherein the vanadium dioxide is covered with a thin dielectric film of magnesium flouride.
Figure 8:
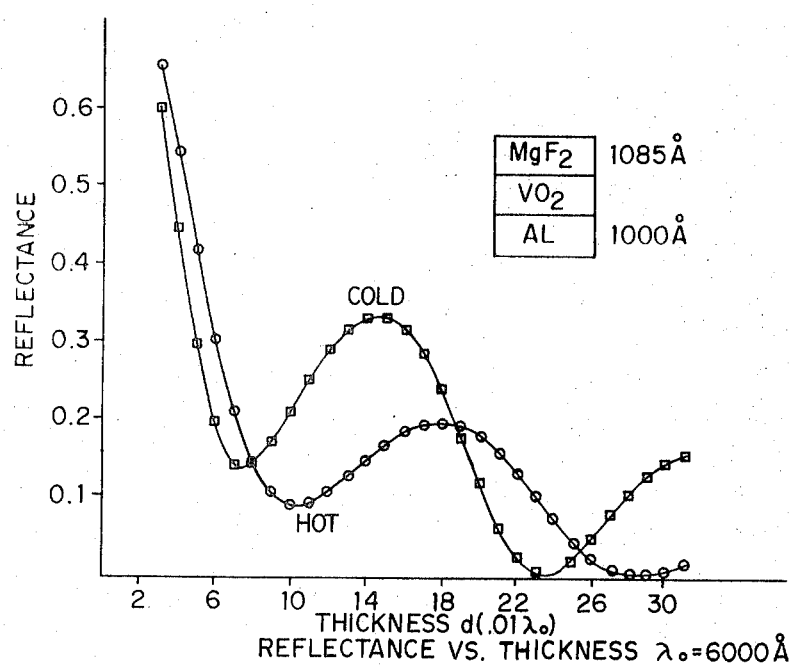
FIG. 8 is a plot of reflectance versus $VO_2$ film thickness for a multi-layer mirror, with the incident radiation being 6,000A, and showing particularly that the reflectance decreases as the thickness of the vanadium dioxide layer increases.

A practical situation sometimes exists in which the thermochromic mirror may be sujected to a corrosive atmosphere; and since $VO_2$ is soluble in both acids and bases, the film must be protected. Therefore, the $VO_2$ film must be covered by a transparent dielectric coating while the mirror still maintains its thermochromic properties. In FIG. 8 the results of calculations for a three layer $MgF_2$-$VO_2$-Al stack are shown, in which the $MgF_2$ layer is fixed at $\lambda_o/n4$ for a design wavelength of 6,000 A. The $VO_2$ layer is of variable thickness, as in FIGS. 2 and 4. These data indicate the absorption is much greater in this configuration, since the maxima damp out more rapidly. Following the earlier procedure, a maximum reflectance of about 30 percent is selected for the cold state which will produce a hot reflectance of about 10 percent, i.e., a 3:1 contrast. FIG. 3 reveals that a $VO_2$ thickness of 720 A in a stack with 1,085 A of $MgF_2$ (as the outer dielectric coating) should give these results at $\lambda = 6,000$ A. The spectral response of this mirror is shown in FIG. 9. This mirror has a much broader bandwidth than any of those described before, and it will have a much greater apparent contrast when viewed under ambient lighting conditions; however, the monochromatic contrast is not as great as those obtained with other configurations.

The design procedure for this type of thermochromic mirror may also include the case in which a $VO_2$ layer thickness is specified and the dielectric thickness is varied, as shown in FIG. 10. This stack includes a variable MgF$_2$ thickness with the VO$_2$ thickness held constant at 600 A. It may be noted that better contrasts are obtained for dielectric thickness greater than the quarter wavelength films used earlier. If one selects a stack having 600 A of VO$_2$ overlayed with 1,860 A of MgF$_2$, a mirror is obtained having a spectral response shown in FIG. 11; this is very similar to the response of FIG. 3 for a two layer film, but the VO$_2$ film is now protected from the environment.

Referring next to FIG. 12, a segment of a multilayer mirror is shown in elevation. This particular mirror was designed to have a maximum reflectivity at $\lambda = 5,400$ A when cold (i.e., at room temperature). It was produced in the following manner. First a Pyrex substrate was thoroughly cleaned, and then one surface was coated with aluminum so as to provide a highly reflective surface. The exposed surface of the aluminum was then anodized for a period of time sufficient to produce an $\lambda/4$ optical thickness of Al$_2$O$_3$. On top of this was deposited a thin film of vanadium of a thickness of about 250 A; this film was then oxidized to provide a $\lambda/4$N layer of vanadium dioxide. A suitable apparatus for the vacuum deposition of vanadium and the subsequent oxidation thereof is described in the aforementioned patent application Ser. No. 284,304 filed on Aug. 28, 1972 by the present inventors entitled "Preparation of Thin Films of Vanadium Oxide." Next, a dielectric film of silicon oxide is deposited. Silicon oxide is particularly useful in the preparation of multi-layer devices of this invention, because it is compatible with both vanadium and vanadium dioxide, and it is readily applicable with vacuum deposition techniques; it is also stable at the elevated temperatures (e.g., 500°C) at which vanadium is frequently oxidized to produce VO$_2$. On top of the SiO$_2$ film is placed still another layer of VO$_2$, which is preferably obtained in the same manner by depositing vanadium and then oxidizing it.

The optical thickness, $\delta$, of a given layer in the device is equal to $Nd$, where N is the index of refraction and $d$ is the actual film thickness of a layer. Ideally, the refractive indices of the dielectric films should be significantly different from the refraction index of VO$_2$, in order to enhance the reflection of light at each interface. This is typically accomplished by employing a material whose index of refraction is lower than that of VO$_2$, but not equal to that of air—when the device is to be viewed in air. In this case, both the index of SiO$_2$ and Al$_2$O$_3$ are about 1.6; the index of VO$_2$ is about 2.9, so with these materials the "appreciably less" criterion is satisfied.

In order to physically achieve a desired thickness in the aluminum and silicon oxide layers, such layers can be conventionally applied through the use of an electron beam gum with the aid of conventional thickness monitors and controllers. To achieve a desired thickness in the vanadium oxide layers, however, requires some attention to the fact that vanadium more than doubles in thickness as it is converted into VO$_2$. To achieve a physical thickness equal to $\lambda/4$N, i.e., about $\lambda/12$, a film of vanadium equal to about $\lambda/24$ is initially deposited. This film is then oxidized to produce the appropriate thickness of VO$_2$. Exemplary values for the thickness of the layers in FIG. 2 are: aluminum 1,000 A; Al$_2$O$_3$ 845 A; VO$_2$ 455 A; SiO$_2$ 845 A; and VO$_2$ 455 A. Experience has shown that the minimum thickness of the VO$_2$ layer should be at least 150 A in order to have any significant phase-shift effect on the reflected light; and the VO$_2$ should be less than 2,000 A in order to keep absorption within tolerable limits. Hence, the VO$_2$ layer should have a thickness in the range of about 150 A to 2,000 A.

There is also what amounts to an operational limit for the devices described herein, namely, that the incident wavelength be in excess of 4,000 A, i.e., beyond ultraviolet; this is because the absorption by the vanadium oxides is just too great for wavelengths less than 4,000 A. A preferred range for incident wavelengths is from 4,500 A out to the infrared (10.6 microns). The very best reflection results are found where the absorption is the least, i.e., in the range of 6,000 A to 1 micron.

The construction shown in FIG. 12 has only two layers of VO$_2$, and its performance is shown in FIG. 13; in this figure it can be readily seen that the reflectance of the multilayer device is greatly improved over that of a single layer of VO$_2$. Furthermore, the contrast between the reflectance of the device in its hot and cold states has been dramatically changed at some wavelengths. By use of the expressions "hot" and "cold" it will be understood that reference is being made to the transition temperature of VO$_2$. The "cold" measurements were made at 25°C which is appreciably below the transition temperature, and the "hot" measurements were made at 70°C.

While only the preferred embodiments of the invention have been disclosed in great detail herein, it will be apparent to those skilled in the art that modifications thereof can be made without departing from the spirit of the invention. Thus, the methods taught and the structures shown herein are intended to be exemplary and are not meant to be limiting, except as described in the claims append hereto.

What is claimed is:

1. A temperature-dependent mirror which is adapted to reflect white light in either one of two colors, depending upon the mirror's temperature history, said mirror utilizing a very thin film of vanadium dioxide which is a material which exhibits hysteresis in switching from one reflectance to another when caused to pass through a certain transition temperature, comprising:
    a. a substrate having a highly reflective surface;
    b. a coating of vanadium dioxide on the highly reflective surface of the substrate to which the white light is to be directed, said coating having a thickness of no more than 2,000 angstroms; and
    c. means for changing the temperature of the coating of vanadium dioxide to temperatures above and below its transition temperature.

2. The temperature-dependent mirror as claimed in claim 1 and further including a thin, transparent dielectric film on top of the coating of vanadium dioxide.

3. The temperature-dependent mirror as claimed in claim 2 wherein the index of refraction of the dielectric film is appreciably different from the index of refraction of vanadium dioxide.

4. The temperature-dependent mirror as claimed in claim 2 wherein the dielectric film is selected from the group including silicon dioxide magnesium flouride, and aluminum oxide.

5. The temperature-dependent mirror as claimed in claim 1 wherein a transparent dielectric material is interposed between the vanadium dioxide and the substrate, and said dielectric material has a lower thermal conductivity than the vanadium dioxide, whereby the resolution of a recorded image in the vanadium dioxide in response to thermal stimuli will be enhanced.

6. The temperature-dependent mirror as claimed in claim 1 and further including a second thin layer of vanadium dioxide, with the layers of vanadium dioxide being separated from each other by a transparent layer of a dielectric material.

7. The temperature-dependent mirror as claimed in claim 6 wherein each of the vanadium dioxide films has a thickness in the range of about 150A to 2,000A.

* * * * *